US010758919B2

(12) United States Patent
Filmer et al.

(10) Patent No.: US 10,758,919 B2
(45) Date of Patent: Sep. 1, 2020

(54) REDUCING THE NEED FOR TAILINGS STORAGE DAMS IN MINERAL FLOTATION (71) Applicant: ANGLO AMERICAN SERVICES (UK) LTD, London (GB)

(72) Inventors: Anthony Owen Filmer, Kangaroo Point (AU); Daniel John Alexander, London (GB)

(73) Assignee: ANGLO AMERICAN SERVICES (UK) LTD, London (GB)

( * ) Notice: Subject to any disclaimer, the term of this patent is extended or adjusted under 35 U.S.C. 154(b) by 661 days.

(21) Appl. No.: 15/299,955

(22) Filed: Oct. 21, 2016

(65) Prior Publication Data
US 2017/0326559 A1 Nov. 16, 2017

Related U.S. Application Data (60) Provisional application No. 62/334,557, filed on May 11, 2016.

(51) Int. Cl.
*B03D 1/08* (2006.01)
*B02C 23/08* (2006.01)
(Continued)

(52) U.S. Cl.
CPC .............. *B03D 1/087* (2013.01); *B02C 23/08* (2013.01); *B02C 23/14* (2013.01); *B02C 23/18* (2013.01);
(Continued)

(58) Field of Classification Search
CPC . B03D 1/087; B03D 1/10; B03D 1/08; B03D 2203/025; B02C 23/08; B02C 23/38; B02C 23/18; B02C 23/14; B09B 1/00
(Continued)

(56) References Cited

U.S. PATENT DOCUMENTS 3,502,271 A * 3/1970 Hays ................... B03D 1/02
241/20
3,622,087 A 11/1971 Oltmann
(Continued)

FOREIGN PATENT DOCUMENTS

GB 349108 5/1931
WO WO 99/047281 A1 9/1999
(Continued)

OTHER PUBLICATIONS

Bellson Awatey et al., "Incorporating Fluidised-Bed Flotation Into a Conventional Flotation Flowsheet: A Focus on Energy Implications of Coarse Particle Recovery", Powder Technology, vol. 275, May 1, 2015, pp. 85-93, XP055341657, CH, ISSN ISSN: 0032-5910, DOI: 10.1016/j.powtec.2015.01.065, p. 86-p. 91.
(Continued)

*Primary Examiner* — Jonathan G Riley
(74) *Attorney, Agent, or Firm* — Nixon Peabody LLP; Jeffrey L. Costellia (57) ABSTRACT THIS invention relates to a process for recovering value metals from ore (50) configured such as to substantively reduce or eliminate the need for a tailings storage facility. This object is achieved through an integrated processing system designed to enhance the ratio of sand residue from coarse flotation (62) to the amount of tailings arising from fine flotation (72), and then blending a proportion of coarse and fine flotation gangue materials into a free draining stack (82).

40 Claims, 3 Drawing Sheets (51) Int. Cl.
*B02C 23/18* (2006.01)
*B02C 23/38* (2006.01)
*B03D 1/10* (2006.01)
*B02C 23/14* (2006.01)
*B09B 1/00* (2006.01)

(52) U.S. Cl.
CPC ............... *B02C 23/38* (2013.01); *B03D 1/08* (2013.01); *B03D 1/10* (2013.01); *B03D 2203/025* (2013.01); *B09B 1/00* (2013.01)

(58) Field of Classification Search
USPC .................................. 241/23, 29, 24, 101.8
See application file for complete search history.

(56) References Cited

U.S. PATENT DOCUMENTS

| | | | |
|---|---|---|---|
| 3,763,041 | A | 10/1973 | Cook et al. |
| 5,338,337 | A * | 8/1994 | Johnson .................... B03B 9/00 209/164 |
| 5,900,604 | A * | 5/1999 | McNeill .................... B03B 9/00 209/12.1 |
| 6,425,485 | B1 | 7/2002 | Mankosa et al. |
| 9,968,945 | B1 * | 5/2018 | Filmer ...................... C22B 3/04 |
| 10,207,275 | B2 * | 2/2019 | Donda ..................... B02C 23/14 |
| 2005/0139551 | A1 * | 6/2005 | Yoon ........................ B03D 1/08 210/727 |
| 2009/0071295 | A1 * | 3/2009 | Gorain .................... C22B 11/08 75/710 |
| 2011/0155651 | A1 * | 6/2011 | Gorain .................... B03D 1/085 209/162 |
| 2012/0152534 | A1 * | 6/2012 | Troshko .................. E21B 43/40 166/268 |
| 2012/0289440 | A1 * | 11/2012 | Pollard .................... C10G 1/00 508/110 |
| 2013/0134074 | A1 * | 5/2013 | Soane ........................ C22B 3/24 209/162 |
| 2016/0090536 | A1 * | 3/2016 | Yuan ...................... C10G 1/047 208/390 |

FOREIGN PATENT DOCUMENTS

WO  WO 2006/024886 A1  3/2006
WO  WO 2016/170437 A1  10/2016

OTHER PUBLICATIONS

K C Runge et al., "Particle Size Distribution Effects That Should Be Considered When Performing Flotation Geometallurgical Testing", The Second Ausimm International Geometallurgy Conference, Sep. 30-Oct. 2, 2013, Brisbane, Australia, Dominy, Simon, Australia, Jan. 1, 2013, pp. 335-344, XP009193402, ISBN: 978-1-921522-97-0, p. 340.

Benjamin E Wickland et al. "Hydraulic Conductivity and Consolidation Response of Mixtures of Mine Waste Rock and Tailings", Canadian Geotechnical Journal—Revue Canadienne De.Geotechnique NRC Research Press, Canada, vol. 47, No. 4, Jan. 1, 2010, pp. 472-485, XP009193314, ISSN: 0008-3674, DOI: 10.1139/T09-115, p. 472-475.

* cited by examiner

REDUCING THE NEED FOR TAILINGS STORAGE DAMS IN MINERAL FLOTATION

BACKGROUND TO THE INVENTION

Tailings facilities from the recovery of minerals have historically and still continue to create a legacy for the industry, and for the communities which host the mining and mineral processing operations. The tailings are a mix of silt (<75 micron), fine sand (75-150 micron), and coarse sand (>150 micron) from which most of the valuable component of the ore has been recovered using beneficiation techniques such as flotation. The high silt content causes the tailings to have a low hydraulic conductivity, which although they may vary widely, are typically around 10-5 cm/sec which means the tailings do not drain freely.

Fine grinding of the ore (e.g. copper, gold, zinc/lead, nickel, platinum group metals, etc.) is required to liberate the values from the containing gangue, to selectively float the values in a froth flotation cell. For copper, this size range is typically a p80 of between 100 and 200 micron. Consequently, all the gangue materials associated with the valuable mineral are comminuted to a similar size. The resultant tailings are usually stored as a thickened slurry or paste in a purpose built tailings storage facility (TSF) constructed at a significant capital cost.

Figure 1:
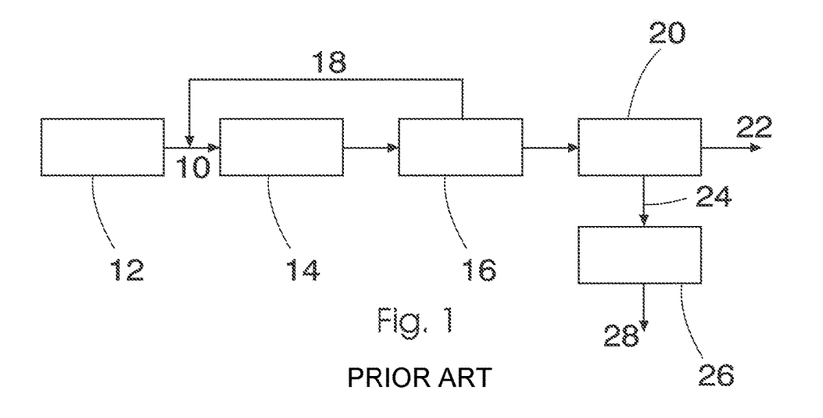
FIG. 1 is a flow diagram of a conventional fine flotation circuit.

With reference to FIG. 1, in a conventional fine flotation circuit, run of mine (ROM) ore 10 from blasting and crushing 12 is ground 14 and classified 16, typically in a closed circuit, returning the oversize material 18 from classification for further grinding, to ultimately produce the required size for flotation. Classified ore is subjected to fine flotation 20, to obtain concentrate 22. Tailings 24 from the fine flotation 20 are thickened in a thickener 26 and stored in a TSF 28.

Various techniques have been proposed, to avoid or minimize the amount of tailings to be stored in a TSF.

In some tailings disposal systems, the coarsest fraction of the tailings, containing mainly a fine sand, is separated by a cyclone, and a proportion of the tailings (typically 5-30% of the total ore depending on the required grind size for flotation) is separately stacked and drained. This modest reduction in quantity of tailings is limited by the need to maintain a free draining sand for disposal. For example, where this sand is used as in a load bearing dam wall, the sand typically requires less than 15% silt content. The residual tailings still require storage in a large purpose built dam.

Increasingly, in areas where the location of the TSF is particularly problematic and water is scarce, the reject slurry is filtered and deposited as a solid sludge containing around 15-20% water. The filtration is costly, due to a slow filtration rate resulting from the low hydraulic conductivity of the tailings (typically containing around 50% silt). The filtered residue has little structural integrity, and remains subject to mud formation and erosion during rain periods and excessive dusting if disturbed.

Various proposals have also been made for blending some fraction of the tailings together with waste rock from the mining process. The fine tailings reduces permeability of the waste rock and hence its propensity for acid generation. However this technique does not enable recovery of significant water from the tailings, and has not been widely adopted by the industry.

The reasons include the mismatch in quantities of tailings and waste rock at different periods of the mine life, and the difficulty in effective distribution of the fine sludge through the waste rock in appropriate proportions.

In recent years, an alternative to conventional fine flotation has been proposed. (G. J. Jamieson, Aus. I. M. M. G.D. Delprat Distinguished Lecture Series, Sydney, 2013) This modification as illustrated below, is termed coarse flotation, and has been promoted as a method of reducing the energy costs associated with fine grinding of ores.

Figure 2:
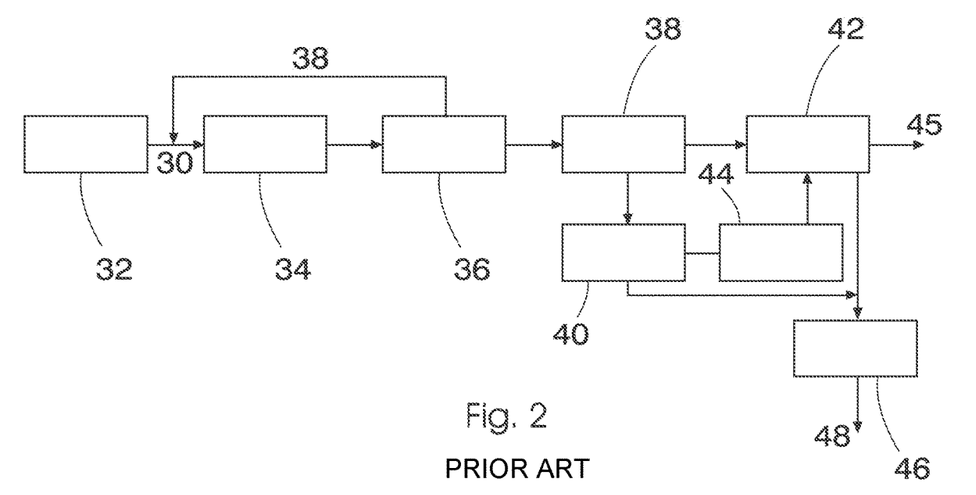
FIG. 2 is a flow diagram showing a course flotation circuit.

With reference to FIG. 2, in coarse flotation, run of mine (ROM) ore 30 from blasting and crushing 32 is ground 34 to a coarser size than that for conventional fine flotation, such that much of the valuable minerals are partially exposed, but not fully liberated. Typically the ideal particle distribution of the feed to a coarse flotation is sized between 150 micron and 1 mm. The upper size is limited by either the design of the flotation equipment or the particle size at which a significant proportions of the valuable component of the ore grains are no longer exposed on the surface of predominantly gangue particles. For copper or gold ores, this upper exposure limit occurs typically at a particle size of around 300-700 micron.

The lower size limit for coarse flotation is determined by the relatively inefficient separation of fines in the coarse flotation equipment. For example, with the commercially available Eriez Hydrofloat cell, the lower size limit is typically around 150 micron, as much of the smaller particles will simply be entrained in the teeter water.

The ground ore is classified in a first classifier 36, typically in a closed circuit, returning the oversize material 38 from classification for further grinding. The classified ore is further classified in a second classifier 38. A fraction of the ore in the selected operational size window for coarse flotation (say 150 micron to 700 micron.) is separated from the remainder of the finer and coarser ROM ore, and is floated in a specially designed coarse flotation cell 40, to produce an intermediate concentrate. The oversize material is recycled for further comminution and the finer material from the pre-classification (typically fine sand and silt at <150 micron, and accounting for 50% or more of the total ROM) is directed to conventional fine flotation 42. The intermediate concentrate produced in coarse flotation, typically 5-20% of the original feed, is reground 44 to a size where the valuable fraction in the ore is liberated and suited to producing a saleable concentrate. It is directed to further beneficiation through conventional flotation 42, along with the fines fraction from classification. This conventional or fines flotation process yields a final concentrate product 45 and a fine tailings residue. Tailings arising from the both the coarse and fine flotation are then combined, thickened 46 and deposited in a TSF 48.

One example of such a coarse flotation cell is the Hydrofloat cell, manufactured by Eriez (U.S. Pat. No. 6,425,485 B1, 2002). The potential for application of this cell for treating copper, gold, and other sulphide ores is described in numerous papers and conference proceedings (such as J. Concha, E. Wasmund http://docplayer.es/10992550-Flotacion-de-finos-y-gruesos-aplicada-a-la-recuperacion-de-minerales-de-cobre.html.) There are also other coarse flotation cell designs, and other related methods have been proposed for separating partially exposed coarse particles from gangue, by selective attachment of a collecting agent and flotation. For simplicity, all these alternative separation technologies, will all be termed coarse flotation.

It is an object of this invention to provide an integrated processing system utilising coarse particle flotation to eliminate or reduce the requirement for a tailings storage facility (TSF).

SUMMARY OF THE INVENTION

According to the invention, there is provided an integrated process for recovering value metals from ore configured such as to substantively reduce or eliminate the need for a tailings storage facility, including the steps of:
a) comminution of the ore in a comminution device,
b) classification of the comminuted ore in a classification device to obtain a classified fraction suitable for recycling for further comminution, a classified fraction suitable for coarse flotation, and classified fraction suitable for fine flotation;
c) subjecting the fraction suitable for coarse flotation to coarse flotation to obtain an intermediate concentrate and a coarse sand residue;
d) dewatering the coarse sand residue to obtain a dewatered coarse residue;
e) grinding the oversize material in the intermediate concentrate to a size suitable for fine flotation;
f) subjecting the fractions suitable for fine flotation to fine flotation and obtaining a fine tailings;
g) thickening the fine tailings thickened fine tailings; and
h) blending the dewatered coarse sand residue and thickened fine tailings, typically to obtain a blend containing from 10% up to 30% by mass of thickened fine tailings (a silt containing very fine tailings of less than 75 micron diameter), and from 70% to 90% by mass dewatered coarse residue with a particle size of greater than 75 microns, and dry stacking the blend thereby to obtain a stacked heap that is stable and free draining. Typically, the blend contains a ratio of 0.5 to 0.7 coarse sand to 0.5 to 0.3 fine tailings, preferably a ratio of fine tailings of 0.6 coarse sand to 0.4 fine tailings by mass.

Preferably, the comminution of the ore at step a) is carried out in closed circuit with classification, such as to minimise the exposure of material in the size range suitable for coarse or fine flotation to further comminution, and hence avoid the consequential formation of excessive silt (material with a particle size of less than 75 micron diameter). While the comminution circuit may operate at a p80 of considerably higher than the desired upper size limit for coarse flotation, the oversize particles of diameter greater than around say 500 micron, where values for the specific ore are not sufficiently exposed at the surface, are classified and recycled for further comminution. Whilst the preferred comminution device will have a Schumann modulus that minimises the generation of fines as described in Runge et. al. in the Second Aus. I. M. M. Geometallurgy conference 2013, the concept of scalping the undersize from the recirculating comminution load, for coarse flotation, is applicable to all known comminution devices. Whilst the preferred classification device will have a sharp partition curve, (with the sharpness of this curve best defined by alpha values greater than 3, preferably greater than 5 in the classification efficiency curve described in Napier Munn et al in Mineral Comminution Circuits (JKMRC Monograph), 1996, for example a screen or hydraulic classifier, to minimize the displacement of material finer than the desired classification size back to comminution, the concept is applicable to all known classification devices.

Preferably, the silt (particles of less than 75 micron diameter) content formed in comminution of step a) is less than 25% by mass of the ore and more preferably less than 20%, and even more preferably less than 15%; and the ore for coarse flotation is ground to a size required for exposure of at least 85% and preferably greater than 90% of the values in the ore being processed, for example, the ore should be ground and classified to generate a particle size range of greater than 150 micron up to 1000 micron, typically 200 micron up to 800 micron, and preferably 200 micron up to 500 micron.

Preferably, undersize particles from the product of the first classification are separated in a second classification device, into a fine fraction typically less than 150 micron, which is then subjected to either grinding e) or directly to fine flotation step f), depending on the preferred size for fine flotation of a particular ore.

The classification fraction between the minimum size of around 150 micron and the maximum size of say 700 micron is subjected to coarse flotation at step c). In step c), the mass of the intermediate concentrate produced is less than 25% of the coarse flotation feed, and preferably less than 20% and even more preferably less than 15%.

The intermediate concentrate from step c) is directed to a regrind and classification process in step e), to produce the optimum size distribution of 20 to 125 micron for fine flotation step f), again without creating excessive silt, i.e. where the mass of silt formation is constrained to less than 50% of the mass of the feed to regrind, and preferably less than 40% and even more preferably less than 30%.

In accordance with the process of the invention:
the comminution and classification devices are selected and operated to minimise the generation of silt during comminution. This is achieved by selecting a comminution device with an acceptable Schumann modulus; and operating this device in closed circuit with a classification device having a steep partition curve of alphas (Napier Munn et al, 1996) greater than 5; and maintaining the p80 of the output from the comminution device at a higher p80 than that for the upper size limit for coarse flotation, such that more than 50% of the flow from the comminution device is recycled for further comminution.
the comminution and classification devices are selected and operated to maximize the rejection of liberated gangue as a coarse sand residue. This is achieved by selecting the upper and lower size limits for classification such that gangue particles are liberated from the mineralised ore, at a size where coarse flotation can differentially float exposed mineralisation (typically from 150 micron to 1.0 mm), leaving the gangue without any mineralised exposure to report to the coarse flotation residue.

In a first embodiment of the invention:
the sand residue from coarse flotation in step c) has a hydraulic conductivity of higher than 1 cm/sec, preferably higher than 0.1 cm/sec, more preferably higher than 0.01 cm/sec, and drains at a rate that allows hydraulic stacking and draining, or rapid dewatering by screening or filtering in step d), and preferably contains more than 60% of the gangue present in the ROM ore;
the sand residue is dewatered i.e. water content is reduced to 8 to 12%, typically around 10% by weight;
tailings from fine flotation at step e) is partially dewatered, i.e. water content is reduced to 35 to 45%, typically around 40% by weight in step g), to form a slurry or paste; and
the slurry or paste tailings is blended, in step h), with the dewatered coarse sand residue, to produce said blend.

In a second embodiment of the invention:
the upper classification size in step b) is increased beyond that for optimum recovery in coarse flotation in step c), i.e. by increasing the size up to a maximum at which coarse particles with surface exposure float, typically up to a maximum size of 0.7 to 1.5 mm;

the coarse flotation residue from step c) is further classified to separate a coarser middlings fraction still containing some significant occluded values, i.e. above the size at which most of the mineralised material has some surface exposure; and a finer sand residue, typically with a size in the range from of around 150-600 micron, which is suitable for disposal as in the first embodiment; and the lower grade middlings fraction may be reground or stored until it is reprocessed later in the mine life, enabling increased processing of higher grade ROM ore through the installed comminution assets.

In a third embodiment of the invention:

residues from coarse flotation and fine flotation processes may be recombined to enable the combined slurry to be transported to a suitable destination. The combined stream can then be dewatered; either by filtration in which the presence of coarse particles assist the filtration rate; or preferably reclassified to generate a coarse and fine fractions that are processed as described in the first embodiment.

DETAILED DESCRIPTION

According to the present invention there is provided a process to eliminate or greatly reduce the proportion of the run of mine ore which must be impounded in a purpose built tailings storage facility (TSF).

These objects are achieved through an integrated processing system designed to enhance the ratio of sand residue from coarse flotation to the amount of tailings arising from fine flotation, and then managing the placement of all or a proportion of the combined coarse and fine flotation gangue materials into a single free draining stack. Through this a novel system, the need for any purpose built TSF can be eliminated or at worst, reduced very substantially.

The essence of the invention is an integrated system of comminution, classification, coarse flotation, fine flotation, residue drainage, blending, and dry stacking. By effective control of fines, and in particular silt, generation at all stages of comminution, a high proportion of the run of mine (ROM) ore is separated into a desired particle size window for coarse flotation. This enables both high flotation recoveries of the valuable component, and rejection of a large proportion of the gangue as a coarse sand residue. This free draining residue can then be blended with the thickened fine tailings slurry, to produce a composite material with a silt content which still allows draining, and hence is suitable to be independently stacked.

Figure 3:
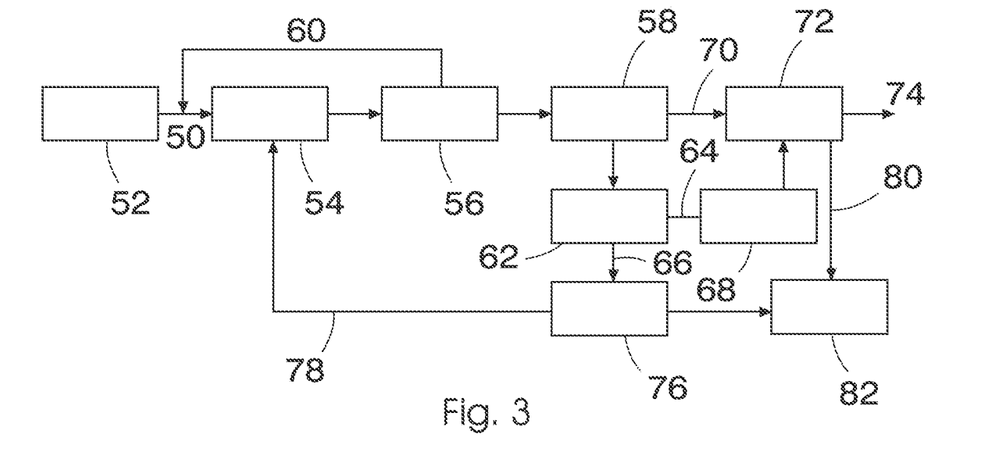
FIG. 3 is a flow diagram of a course flotation circuit according to a first embodiment of the invention.

With reference to FIG. 3, in a process of a first embodiment of the invention, run of mine (ROM) ore 50 from blasting and crushing 52 is ground 54 to expose the valuable components for coarse flotation. Two stages of classification, a first classification stage 56 and a second classification stage 58, are used sequentially to recycle the ore that is still too coarse for coarse flotation for further comminution, and to separate the fines to bypass the coarse flotation and go direct to fine flotation. Oversize material 60 from the first classification stage 56 is recycled. The ore which is in the desired operational size window, is subjected to coarse flotation 62 to produce an intermediate concentrate 64 and coarse sand residue 66 containing most of the gangue. The intermediate concentrate 64 from coarse flotation 62 is reground 68, and together with the fines 70 from the original classification, are subjected to fine flotation 72 to obtain a concentrate 74. The sand residue 66 from coarse flotation 62 is drained 76 to recover the contained water 78 which is recycled, and the tailings 80 from the fine flotation are thickened to reduce the contained water. The coarse sand and thickened fine tailings are then blended, and stacked 82. The key to producing a stackable tailings 82 is the quantity of fines contained in the blend, and in particular the amount of silt (defined as tailings of less than 75 micron diameter). This fine silt greatly inhibits the drainage characteristics of the final stack. Whilst each ore will be slightly different, it is known that stacked heaps of coarse sand can be stable up to around 25% contained silt. Above around 25% of silt, the hydraulic conductivity of the stack declines substantially, making uncontained storage of such material increasingly problematic in wet climates, or areas subject to seismic activity, or on mountain slopes, or where the stack is required to exhibit structural integrity.

The first component of the complete integrated system, that is the subject of this invention, is a comminution and classification process (both in the primary grind and regrind). The primary grinding process should be configured to generate a silt content in the comminuted ore that is below 20%, and preferably below 15%, whilst ensuing the feed to coarse flotation is ground to the size required for exposure of at least 85% and preferably greater than 90% of the values in the ore being processed. Through operating known comminution devices with a high Schumann modulus, such as tertiary crushers and rod mills, or somewhat lower modulus, (HPGR, SAG and ball mill) in a closed circuit with known classification devices with a sharp partition curve (such as Derrick or DSM screens or various hydraulic classifiers) or not so efficient classifiers such as hydrocylones, the comminuted ore inside the selected operating window can be 'scalped' for coarse flotation. To achieve this, the equipment selection, configuration and recirculating flows are specifically designed to avoid formation of fines in comminution, and to avoid displacement of material which is already ground to within the selected size window; into the recirculating load to comminution. The size for the classification from the recirculating comminution load is set to maximize the scalp from the recirculation comminution load, consistent with achieving satisfactory recoveries in coarse flotation. For copper ores, this upper size is typically in the range 350-600 micron. The system design principle is to avoid generation of fines in comminution and then maximize removal of material below the upper size range from the comminution circuit, to avoid the possibility that is will be over-ground to produce silt. This affects the ideal selection of comminution and classification devices. For instance, a rod mill is well known to provide a sharper size distribution curve than a ball mill. And the use of a conventional cyclone for classification, provides an inferior partition curve to screens or classifiers.

The second component of the system is classification of material that is finer than that suited to coarse flotation. The separation efficiency of fines in coarse flotation is limited, relative to conventional fine flotation. If the selected coarse flotation equipment does not require fines removal, this component becomes optional, with the fine material being floated along with the exposed mineralisation.

The third component of the complete system, is the coarse flotation itself, and the subsequent dewatering of the coarse flotation residue. The mass pull of the intermediate concentrate from coarse flotation can be adjusted to yield a satisfactory recovery and grade. (Typically this will be a mass pull to concentrate of 5-30% of the feed, and preferably around 10-20%). The resulting coarse sand residue (around 50-60% of the run of mine ore), has most of the sulphides removed and has a high hydraulic conductivity and can be readily screened, or allowed to drain naturally, to recover the contained water. The recovered water is essentially free of slimes and is readily recyclable. The dewatered coarse sand residue then typically contains around 10% by weight water.

In the fourth component of the complete system, this intermediate concentrate is reground to more fully liberate the values. It is mixed with the stream of undersize material produced by earlier classification, and floated to produce a saleable concentrate. Or in the case of gold, leached to recover the exposed gold. The final tailings from this further flotation represents around 40-50% of the total mass of the ROM ore, with a contained fraction of sub 75 micron silt typically around half of the total material in this fine flotation reject stream. This typically equates to a total of sub 75 micron material of around 20-25% by mass of the original ROM. In the fifth component of the complete system, the tailings from fine flotation is dewatered to the extent possible. This is typically undertaken in a thickener to produce a thickened tailings or paste, but the fine tailings could also be filtered to recover additional water.

In the sixth component of the complete system, this thickened slurry or paste is blended back in part or totally, with the drained coarse sand residue. The desired blending ratio will be limited according to the geotechnical requirements for the residue heap. Meeting these specifications will be affected by the quantity of silt, resulting from the design and operation of other parts of the system. For a free standing sand heap akin to waste rock, it is desirable that the silt content is less than around 25%, whilst for more load bearing applications such as dam construction, preferably less than 15% silt. Above 25% silt, there will be an increased need for compaction and buttressing. The water content of this combined residue is typically around 20% by weight.

In the event that the system of comminution and classification, for a particular orebody, does not achieve a blended product with acceptable geotechnical characteristics for disposal, a proportion of the fines will require storage in a TSF. Or, in the case where there is a lower cost disposal option for a fraction of the fines into a conventional TSF, the blending ratio can be adjusted accordingly.

The blended residue can be transported by truck or conveyor, and stacked in a manner conducive to long term sustainable disposal.

In summary, the overall system of comminution, classification, coarse and fine flotation, draining, thickening and blending, results in a significantly lower unit cost to process low grade ore. This is a consequence of significantly lower comminution costs (coarser grind); lower water consumption, and capacity requirements for any purpose built TSF. This lower unit cost structure can reduce the viable cut-off grade, thus increasing the economic resource recovery and substantively improving the mine life. It is applicable to both resources where storage of tailings in a slurry form is particularly problematic, and where a more sustainable disposal method is desirable from a long term closure perspective.

Figure 4:
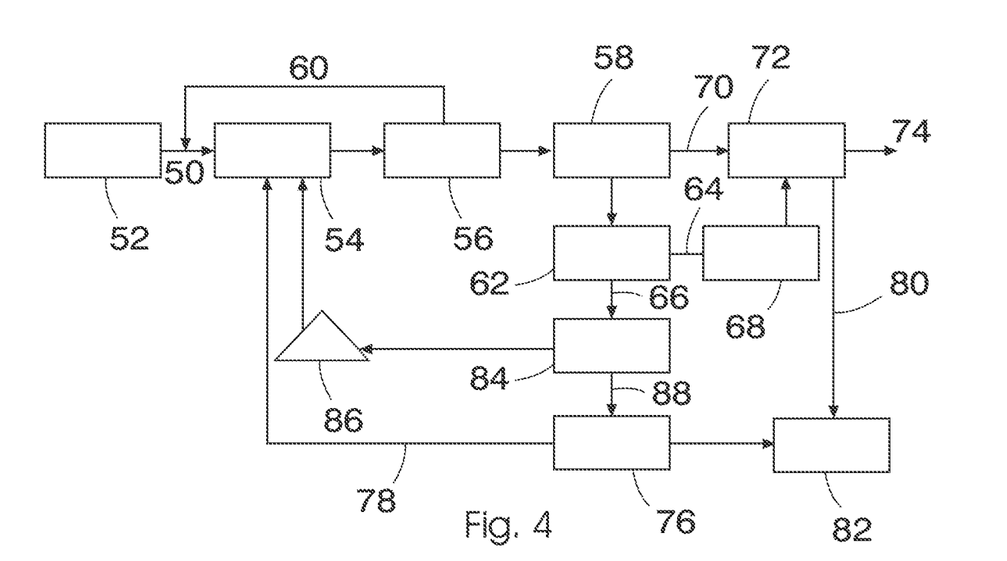
FIG. 4 is a flow diagram of a course flotation circuit according to a second embodiment of the invention.

A second embodiment of the invention outlined in FIG. 4, in which the process is configured in a low grade storage configuration. With reference to FIG. 4, run of mine (ROM) ore 50 from blasting and crushing 52 is ground 54 to expose the valuable components for coarse flotation. Two stages of classification, a first classification stage 56 and a second classification stage 58, are used sequentially to recycle the ore that is still too coarse for coarse flotation for further comminution, and to separate the fines to bypass the coarse flotation and go direct to fine flotation. Oversize material 60 from the first classification stage 56 is recycled. Ore which is in the desired operational size window is subjected to coarse flotation 62 to produce an intermediate concentrate 64 and coarse sand residue 66 containing most of the gangue. The intermediate concentrate 64 from coarse flotation 62 is reground 68, and together with the fines 70 from the original classification, are subjected to fine flotation 72 to obtain a concentrate 74.

In this second embodiment of the invention, the upper size limit for the operational window processed through coarse flotation 62 is set at a higher particle size. This upper size limit can be between 500 and 1500 micron, depending on exposure characteristics of the specific ore and the flotation characteristics of the coarse flotation equipment. The increased size range of the operational window, increases the scalp of material taken from each pass of the circulating load between comminution and classification. As such, it reduces the cycle of material 60 just above the ideal size range for coarse flotation, and hence the proportion of silt being formed in this initial comminution circuit.

In this configuration, it is accepted that a significant fraction of the values contained in the coarsest of the ore particles sent to coarse flotation will be occluded in gangue, and thus not have an appropriate surface for bubble attachment during coarse flotation. Recoveries through coarse flotation will therefore be restricted to the exposed grains, and hence recovery of the coarsest ore fraction will be lower than achievable with a finer classification size. However, most of the occluded valuable ore remaining in the coarse flotation residue 66 will be in the coarsest particles, and can be separated from the coarse flotation residue by normal classification devices. This coarsest fraction, whilst lower grade than the ROM feed due to natural partitioning during comminution and being partially denuded of its values by coarse flotation, is still worthy of further grinding for mineral recovery. The coarsest fraction can be separated from the coarse flotation residue using well known size classification equipment 84, drained and stored as a middlings 86, for retreatment at an appropriate time by regrinding or heap leaching. The finer fraction from this post flotation classification (typically between 150 and around 600 microns depending on the ore liberation characteristics) then forms the final coarse flotation residue 88 which is drained 76 to recover the contained water 78 which is recycled, and the tailings 80 from the fine flotation are thickened to reduce the contained water. The coarse sand and fine tailings are then blended, and stacked 82. The advantage of this configuration is that additional higher grade ROM ore can replace the lower grade middlings in the available comminution capacity, thus improving the production profile of the mine. Ultimately, the middlings can be reclaimed from storage and reprocessed later in the life of mine, and hence is not sterilised. Alternatively, the middlings can be subjected to a heap leach. In this sense, this variant is akin to the grade engineering method that is practiced with coarsely crushed ore.

Figure 5:
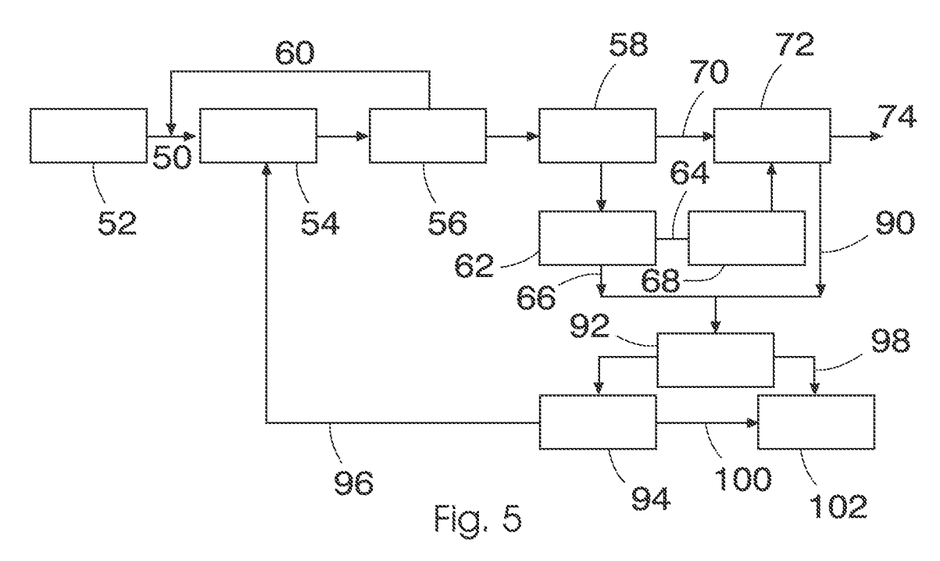
FIG. 5 is a flow diagram of a course flotation circuit according to a third embodiment of the invention.

A third embodiment of the invention is illustrated in FIG. 5. This embodiment is typically used where the slurry transport of the residue and tailings to a disposal site is a specific consideration. With reference to FIG. 5, run of mine (ROM) ore 50 from blasting and crushing 52 is ground 54 to expose the valuable components for coarse flotation. Two stages of classification, a first classification stage 56 and a second classification stage 58, are used sequentially to recycle the ore that is still too coarse for coarse flotation for further comminution, and to separate the fines to bypass the coarse flotation and go direct to fine flotation. Oversize material 60 from the first classification stage 56 is recycled. Ore which is in the desired operational size window is subjected to coarse flotation 62 to produce an intermediate concentrate 64 and coarse sand residue 66 containing most of the gangue. The intermediate concentrate 64 from coarse flotation 62 is reground 68, and together with the fines 70 from the original classification, are subjected to fine flotation 72 to obtain a concentrate 74. The system is similar to the first embodiment of the invention, except that the waste materials from both the fine and coarse flotation, i.e. the course residue 66 and fine tailings 90, are recombined to transport them as a combined slurry to their disposal location. Here they can be filtered, or the predominantly coarse fraction (>150 micron) can be separated using a cyclone or similar classification device 92, and drained 94 to mostly replicate the original formulation of free draining coarse sand residue. Water 96 drained at 94 can be recycled. The fine material in the cyclone overflow replicates the fines flotation tailings, which again is treated as described previously. The thickened fines 98 are blended with the drained coarse material 100 and dry stacked 102.

In summary, through selection of appropriate comminution and classification designs and operating conditions, and using coarse flotation techniques, and draining of the coarse residue, and blending this with the thickened fine tailings, in an integrated production system, this invention can:
achieve high mineral recoveries
at reduced energy consumptions;
and recover a substantive proportion of the water from the residue;
and eliminate or greatly reduce the requirement for a TSF.

Further benefits may also accrue for some orebodies. Through the resulting unit cost savings, the integrated system also enables a reduction in the economic cut-off-grade of the ore, and hence enhances the overall resource recovery. The integrated system also potentially improves the capital intensity of the overall comminution and classification circuit.

Example

Partially ground ROM ore from a Chilean mine from the cyclone underflow in the existing comminution circuit. It was used for testing coarse flotation and dry stacking. Recoveries of copper were consistent with the degree of exposure of the copper mineralization on the surface of the particles. Copper recoveries were greater than 90% at a particle size of 350 micron, falling to less than 70% recovery at a particle size of 500 micron. The overall mass pull was 20%. Thus a high recovery in coarse flotation can be achieved when the ROM material classified to a maximum particle size of around 450 micron. The sulphur content of the residue was 0.3%, with no observable surface expression of sulphides.

The coarse residue drained freely to a contained water content of 10%. The thickened fine residue had a water content of 40%. When mixed in a ratio of 0.6 coarse to 0.4 fine material, the combined solids exhibited sufficient structural integrity for independent stacking.

Modelling of the comminution circuit (SAG and ball mill) indicates that with use of a classification device with a sharp partition curve (either a screen or hydraulic classifier), the % of silt reporting to combined residue would be significantly less than 30% of the ROM ore. Use of a comminution device with less propensity for fines formation (e.g. cone crusher or rod mill or mineral sizer or vertical shaft impactor), this silt content would reduce further.

The invention claimed is:
1. An integrated process for recovering value metals from ore containing value metals, including the steps of:
   a) comminution of the ore in a comminution device,
   b) classification of the comminuted ore in a classification device to obtain a classified fraction suitable for further comminution, a classified fraction containing value metals suitable for coarse flotation with a particle size greater than 150 micron up to 1000 micron, and classified fraction containing value metals suitable for fine flotation with a particle size less than 150 micron;
   c) subjecting the fraction suitable for coarse flotation to coarse flotation to obtain an intermediate concentrate containing value metals, and a coarse sand residue with a particle size of greater than 150 micron up to 1000 micron;
   d) dewatering the coarse sand residue from step c) to obtain a dewatered coarse residue;
   e) grinding said intermediate concentrate containing value metals from step c) to a size suitable for fine flotation with a particle size of 20 to 125 micron;
   f) subjecting the fractions suitable for fine flotation from steps b) and e) to fine flotation and obtaining a fine tailings and a concentrate containing value metals;
   g) thickening the fine tailings to obtain thickened fine tailings; and
   h) blending the dewatered coarse residue from step d) with the thickened fine tailings to obtain a blend wherein the blend contains a ratio of 0.5 to 0.7 coarse residue to 0.5 to 0.3 fine tailings, by mass, and dry stacking the blend thereby to obtain a stacked heap.

2. The process claimed in claim 1, wherein the blend contains from 10% up to 30% by mass thickened fine tailings, and from 70% to 90% by mass dewatered coarse residue.

3. The process claimed in claim 2, wherein the blend contains a ratio of 0.6 coarse residue to 0.4 fine tailings, by mass.

4. The process claimed in claim 1 wherein comminution of the ore at step a) is carried out in closed circuit with coarse classification.

5. The process claimed in claim 1, wherein the comminution device has a Schumann modulus that minimises the generation of fines.

6. The process claimed in claim 1, wherein, in step b), the classification device has a sharp partition curve with an alpha value greater than 3.

7. The process claimed in claim 1, wherein, in step b), the classification device has a sharp partition curve with an alpha value greater than 5.

8. The process claimed in claim 6, wherein the classification device is a screen or hydraulic classifier.

9. The process claimed in claim 1, wherein the silt content formed in comminution of step a) is less than 25% by mass of the ore.

10. The process claimed in claim 9, wherein the silt content formed in comminution of step a) is less than 20% by mass of the ore.

11. The process claimed in claim 10, wherein the silt content formed in comminution of step a) is less than 15% by mass of the ore.

12. The process claimed in claim 1, wherein at step a) the ore is ground to a size required for exposure of at least 85% of the values in the ore being processed.

13. The process claimed in claim 12, wherein at step a) the ore is ground to a size required for exposure of greater than 90% of the values in the ore being processed.

14. The process claimed in claim 1, wherein at step a) the ore is ground and classified to a particle size range of greater than 150 micron up to 1000 micron.

15. The process claimed in claim 14, wherein at step a) the ore is ground and classified to a particle size range of greater than 200 micron up to 800 micron.

16. The process claimed in claim 15, wherein at step a) the ore is ground and classified to a particle size range of greater than 200 micron up to 500 micron.

17. The process claimed in claim 1, the classified fraction suitable for recycling, in step b), has particles over a maximum size selected within the range of 350 to 1000 micron.

18. The process claimed in claim 17, wherein the classified fraction suitable for recycling is recycled for further comminution.

19. The process claimed in claim 1, wherein undersize particles less than 150 micron in size from the classification device are subjected to further classification in a second classification device, and a separated fines fraction is subjected to either fine grinding at step e), or to fine flotation at step f).

20. The process claimed in claim 1, wherein, at step c) the fraction suitable for coarse flotation has a particle size of greater than 150 micron up to 700 micron.

21. The process claimed in claim 1, wherein, in step c), the mass of the intermediate concentrate is less than 25% of the feed.

22. The process claimed in claim 21, wherein, in step c), the mass of the intermediate concentrate is less than 20% of the feed.

23. The process claimed in claim 22, wherein, in step c), the mass of the intermediate concentrate is less than 15% of the feed.

24. The process claimed in claim 1, wherein the intermediate concentrate from step c) is directed to a regrind and classification process in step e), to produce the optimum size distribution for fine flotation of 20 to 125 micron, where the mass of silt is constrained to less than 50% of the mass of the feed to regrind.

25. The process claimed in claim 24, wherein the mass of silt is constrained to less than 40% of the mass of the feed to regrind.

26. The process claimed in claim 25, wherein the mass of silt is constrained to less than 30% of the mass of the feed to regrind.

27. The process claimed in claim 1, wherein the comminution device has a high Schumann modulus to minimise the generation of silt during comminution.

28. The process claimed in claim 27, wherein the material flows through the comminution and classification equipment is configured to maximize the rejection of liberated gangue as a coarse sand residue.

29. The process claimed in claim 1, wherein the coarse sand residue in step c) has a hydraulic conductivity higher than 1 cm/sec.

30. The process claimed in claim 29, wherein the coarse sand residue in step c) has a hydraulic conductivity higher than 0.1 cm/sec.

31. The process claimed in claim 30, wherein the coarse sand residue in step c) has a hydraulic conductivity higher than 0.01 cm/sec.

32. The process claimed in claim 29, wherein the coarse sand residue in step c) contains more than 60% by weight of the gangue present in the ROM ore.

33. The process claimed in claim 1, wherein the coarse sand residue is dewatered to about 8 to 12% water by weight.

34. The process claimed in claim 33, wherein the coarse sand residue is dewatered to about 10% water by weight.

35. The process claimed in claim 1, wherein water in the thickened fine tailings in step g) is reduced to 35 to 45% water by weight.

36. The process claimed in claim 35, wherein water in the thickened fine tailings in step g) is reduced to about 40% water by weight.

37. The process claimed in claim 1, wherein an upper classification size in step b) is increased beyond that for optimum recovery in coarse flotation in step c).

38. The process claimed in claim 37, wherein an upper classification size in step b) is up to a maximum size of 0.7 to 1.5 micron.

39. The process claimed in claim 38, wherein coarse flotation residue from step c) is further classified to separate a coarser middlings fraction, with a size range from 150-600 micron, and a middlings fraction is stored for reprocessing later in the mine life.

40. The process claimed in claim 1, wherein the value metals are copper, gold, zinc, lead, nickel or platinum group metals.

* * * * *